United States Patent [19]

Izumitani et al.

[11] 3,751,272

[45] Aug. 7, 1973

[54] COLORLESS $P_2O_5$ GLASS WITH ANOMALOUS DISPERSION IN SHORT WAVELENGTH REGION

[75] Inventors: Tetsuro Izumitani; Isao Masuda, both of Tokyo, Japan

[73] Assignee: Hoya Glass Works, Tokyo, Japan

[22] Filed: Mar. 2, 1971

[21] Appl. No.: 120,232

[30] Foreign Application Priority Data

Mar. 2, 1970 Japan ................................ 45/17757

[52] U.S. Cl. ................ 106/47 Q, 65/134, 106/47 R

[51] Int. Cl. ............................ C03c 3/02, C03c 3/16

[58] Field of Search .................... 106/47 Q, 47 R, 50

[56] References Cited

UNITED STATES PATENTS

| | | | |
|---|---|---|---|
| 2,996,391 | 8/1961 | Weissenberg et al. | 106/47 Q |
| 2,996,390 | 8/1961 | Weissenberg et al. | 106/47 Q |
| 2,777,774 | 1/1957 | Weissenberg et al. | 106/47 Q |
| 2,684,304 | 7/1954 | Weissenberg | 106/47 Q |

FOREIGN PATENTS OR APPLICATIONS

| | | | |
|---|---|---|---|
| 388,459 | 8/1963 | Japan | 106/47 Q |
| 1,089,935 | 9/1960 | Germany | 106/47 Q |

OTHER PUBLICATIONS

Beals, M. D.; Effects of Titanium Dioxide in Glass; in Glass Industry, Oct. 1963 pp. 569–573

*Primary Examiner*—Helen M. McCarthy
*Attorney*—Sughrue, Rothwell, Mion, Zinn & MacPeak

[57] ABSTRACT

A glass having an anomalous dispersion consisting of, by weight, calculated as the component oxides of said glass, from 38 to 70% $P_2O_5$, from 1.0 to 5.0% $B_2O_3$ and from 1 to 10% $Al_2O_3$as glass-forming materials, wherein the sum of the amount of said $B_2O_3$and $Al_2O_3$ is from 2 to 15%; from 4 to 38% BeO, from 2 to 17% MgO, from 0 to 10% ZnO, from 1 to 8% CaO, from 0 to 10% SrC and from 0 to 3% $As_2O_3$ as glass modifiers, wherein the sum of the amount of said BaO, MgO, ZnO, CaO, SrO and $As_2O_3$ is 51 to 60%; and from 0.05 to 4.0%, based on the total weight of said glass-forming materials and said glass modifiers, of $TiO_2$.

7 Claims, 2 Drawing Figures

PARTIAL DISPERSION RATIO (θhg) AT g-h LINE

ABBE'S NUMBER ($\nu_d$)

INVENTORS
TETSURO IZUMITANI
ISAO MASUDA
BY Sughrue, Rothwell, Mion, Zinn & Macpeak
ATTORNEYS

COLORLESS $P_2O_5$ GLASS WITH ANOMALOUS DISPERSION IN SHORT WAVELENGTH

BACKGROUND OF THE INVENTION

1. Field of the Invention:

This invention relates to an optical glass having an anomalous dispersion in a short wavelength region which has a large Abbe's number and a large partial dispersion ratio in the short wavelength region (generally about 250 to 500 m$\mu$) as compared with normal dispersion glass having a linear relationship between its Abbe's number and partial dispersion ratio; and to a process for the production of such optical glass.

2. Description of the Prior Art:

The need for superachromatic lenses has increased with advances in color photographic techniques. The principle used in designing such lenses consists of removing chromatic aberration at the C- and F-lines, and causing the remaining chromatic aberration, i.e., secondary spectrum, to approach zero in the widest possible range of wavelengths. In normal dispersion glass in which, as shown in the attached FIG. 1, the relationship between Abbe's number $\nu_d$ and the partial dispersion ratio $\theta_{hg}$ (at the *g–h* line), for example, exists substantially on the straight line AB, the secondary spectrum cannot be reduced over a wide range of wavelengths as is seen from the results obtained by determination using König's of Harding's method.

Accordingly, this has led to the demand for anomalous dispersion glass having a different partial dispersion ratio versus Abbe's number from normal dispersion glass in the production of superachromatic lenses. Since particular emphasis is put on achromatization in a short wavelength region in view of the photosensitive wavelength region of a photosensitive material or the degree of dispersion of its refractive index, optical glass having an anomalous dispersion in a region near ultraviolet has been desired.

The partial dispersion ratio may be expressed as follows:

$(n_g - n_F/n_F - n_C)$, $(n_h - n_g/n_F - n_C)$, $(n_i - n_g/n_F - n_C)$, or the like. Since any of these expressions shows a substantially equal tendency, the anomalous dispersion in the present invention will be shown in terms of the partial dispersion ration at the g–h line $[\theta_{hg}=(n_h - n_g)/(n_F - n_C)]$.

Various experiments were performed with a view to obtaining the aforementioned anomalous dispersion glass, and led to the discovery that such glass can be produced by using $P_2O_5$ as a basic glass-forming material and $TiO_2$ as an additive. The presence of $Ti^{3+}$ ions, however, causes some difficulties such as blue violet coloration of the glass or poor meltability. Although such difficulties are known to be overcome to some extent by adding large quantities of alkali oxides thereto, the use of these compounds renderes the stability of the glass extremely poor and remarkably reduces the viscosity of the glass at the time of melting which in turn leads to susceptibility to devitrification and difficulty of forming or fabrication. The chemical durability of the glass is also worsened.

It is therefore an object of the present invention to provide a colorless optical glass free of alkali ingredients, which has the desired anomalous dispersion and superior stability, meltability and chemical durability.

SUMMARY OF THE INVENTION

The optical glass of the present invention is produced from a glass batch consisting of, by weight, calculated as component oxides of glass, 38–70% $P_2O_5$, 1.0 – 5.0% $B_2O_3$ and 1 – 10% $Al_2O_3$ as glass-forming materials, the sum of the $B_2O_3$ and $Al_2O_3$ content being 2 – 15%; 4 – 38% BaO, 2 – 17% MgO, 0 – 10% ZnO, 0 – 8% CaO, 0 – 10% SrO, and 0 – 3% $As_2O_3$as glass modifiers, the sum of the BaO, MgO, ZnO, CaO, SrO, and $As_2O_3$ content being 15 – 60%; and 0.05 – 4.0%, based on the total weight of said glass-forming materials and glass modifiers, of $TiO_2$. The optical glass of the invention has a $\nu_d$ of about 45 to 70 and a $\theta_{hg}$ of about 0.430 to 0.505.

Figure 1:
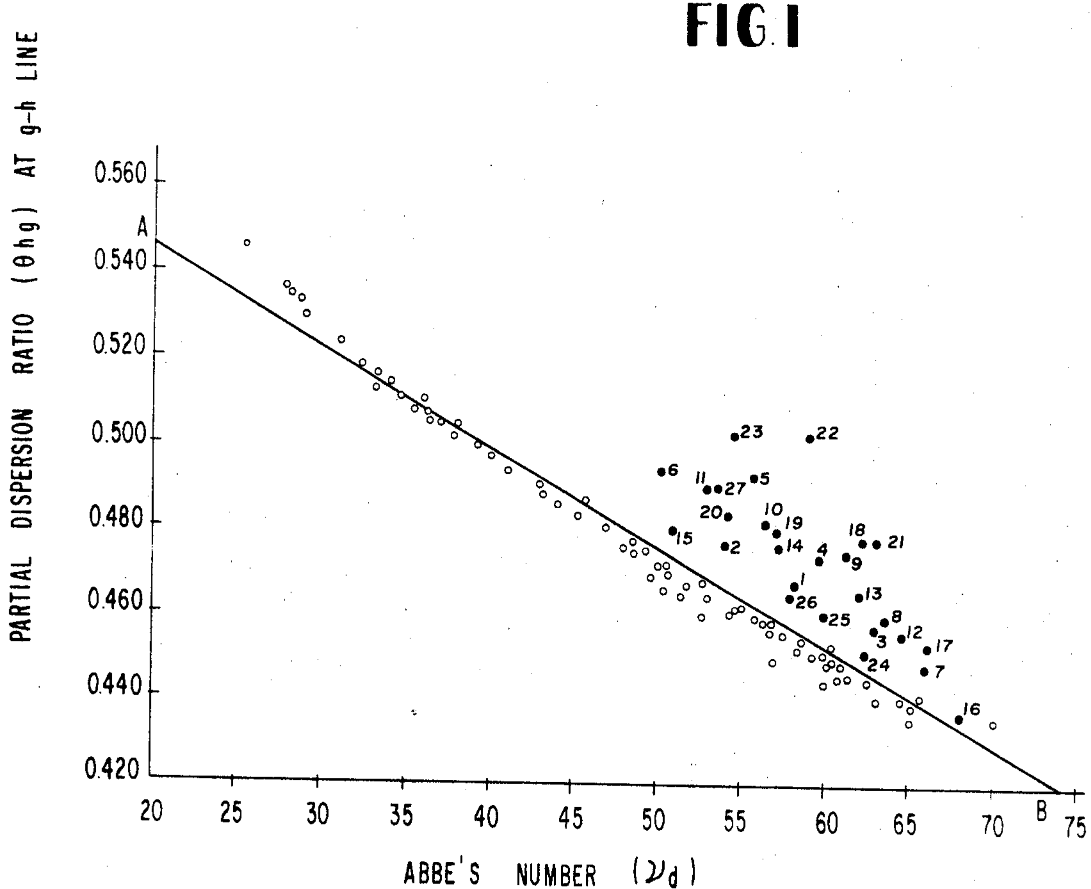
FIG. 1 is a graphic representation showing the relationship between Abbe's number $\nu_d$ and the partial dispersion ratio $\theta_{hg}$ at the *g–h* line both in conventional normal dispersion glass and the anomalous dispersion glass of the present invention. The relationship shown in the former is plotted as the solid circles, while that in the latter as hollow circles.
Figure 2:
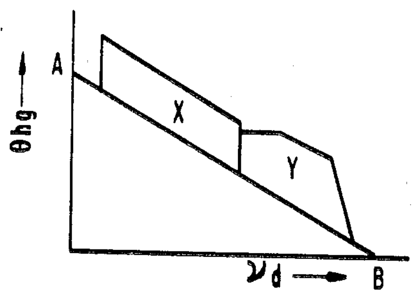
FIG. 2 shows an example of an anomalous dispersion of conventional anomalous dispersion glass at area X, and that of the glass of the present invention at area Y. Glass having an anomalous dispersion shown by Y has been desired in the past.

DESCRIPTION OF THE PREFERRED EMBODIMENTS $P_2O_5$ has a basic absorption in a short wavelength region apart from the visible region, and therefore has a gentle curve showing the dispersion of refractive indices versus wavelengths in the visible region and also a large Abbe's number. This makes it possible to add $P_2O_5$ in somewhat greater quantities, but a suitable amount is from 38 to 70% by weight. If the amount is smaller than this range, the Abbe's number of the resulting glass becomes too small, and amounts in excess of this range result in the narrowing of the vitrification range and poor stability of the glass.

$TiO_2$, on the other hand, has its basic absorption in an ultraviolet region near the visible region, and its addition affects the dispersion curve. But if it is added in an amount of 0.05 to 4.0% by weight based on the total amount of the other glass ingredients, its influence appears only in a region of relatively short wavelengths (about 250 to 500 m$\mu$), and not so much in a visible region around the C- and F-lines. Hence, the addition of $TiO_2$ serves to impart anomalous dispersion by rendering the dispersion ratio in an ultraviolet region relatively large without decreasing the Abbe's number.

When $TiO_2$ is added to $P_2O_5$-rich glass as described above, a slight absorption over a wide range in the vicinity of a wavelength of 580 m$\mu$ occurs, and the glass is colored blue violet. This coloration is due to the absorption inherent to $Ti^{3+}$ ions converted from $Ti^{4+}$ ions. Alkali oxides have been found inadequate to prevent such coloration. In the present invention, the coloration is prevented by adding 1.0 – 5.0% by weight of $B_2O_3$, and 1 – 10% by weight of $Al_2O_3$ (the sum of $B_2O_3$ and $Al_2O_3$ being 2 – 15% by weight) to the glass batch so that the total amount of the glass-forming materials will be 40 – 85% by weight. This also improves the stability or chemical durability of glass. These properties become poor if the amounts of these additional glass-forming materials exceed the ranges specified.

Generally, phosphate glass is most stable when the molar ratio of the glass modifiers to the glass-forming materials is about 4 : 6. If the amounts of the glass-forming materials exceed this ratio, the stability of the glass tends to be worsened, and in smaller amounts, the chemical durability of the glass tends to become poor. However, this can be improved by the proper choice of modifiers. Extensive investigation revealed that the use of BaO, MgO, ZnO, CaO, SrO and $As_2O_3$ give good results. BaO is effective for improving the fusibility, stability and chemical durability of the glass. MgO and ZnO serve to prevent the coloration caused by $Ti^{3+}$. When the amount of $P_2O_5$ is large, MgO needs to be used in a large amount. In conjunction with other divalent ingredients, MgO increases the stability of the glass. ZnO also serves to improve the stability or chemical durability thereof. CaO improves the chemical stability, and increases the stability of the glass when used conjointly with MgO. SrO contributes to the improvement of chemical durability or stability especially when the amount of $P_2O_5$ is relatively small. $As_2O_3$ also helps to prevent the coloration caused by $Ti^{3+}$. These glass modifiers prove effective when used in the amounts specified above, and amounts outside the specified ranges do not give sufficient results in improving the various properties mentioned above.

Glass comprising, by weight, 50 – 70% $P_2O_5$, 1 – 5% $B_2O_3$, 2 – 5% $Al_2O_3$, the sum of $B_2O_3$ and $Al_2O_3$ being 3 – 8%, and 0.5 – 2.5% $TiO_2$ has especially superior stability and durability since it has a large Abbe's number (50.2 – 66.0) and a relatively high $\theta_{Ag}$ (0.443 – 0.493).

The optical glass of the present invention can be produced by any well-known method of producing optical phosphate glass. For example, the following materials may be used as sources for the respective ingredients shown:

| Source Materials | Ingredients |
|---|---|
| $H_3PO_4$ and phosphates below | $P_2O_5$ |
| $H_3BO_3$, $BPO_4$ | $B_2O_3$ |
| $Al(OH)_3$, $Al_2O_3$, $Al(PO_3)_3$, $AlPO_4$ | $Al_2O_3$ |
| $MgCO_3$, MgO, $Mg(PO_3)_2$ | MgO |
| $CaCO_3$, $Ca(OH)_2$, CaO, $Ca(PO_3)_2$, $Ca_3(PO_4)_2$ | CaO |
| $As_2O_3$ | $As_2O_3$ |
| ZnO | ZnO |
| $BaCO_3$, $Ba_3(PO_4)_2$, $Ba(PO_3)_2$ | BaO |
| $SrCO_3$, $Sr_3(PO_4)_2$, $Sr(PO_3)_2$ | SrO |
| $TiO_2$ | $TiO_2$ |

These materials in the amounts specified above in terms of the amounts of the respective oxide ingredients were melted at 1,280° to 1,330° C for about 30 minutes to 2 hours in a platinum crucible, ceramic crucible or clay crucible, stirred and refined to render the quality of glass uniform with the removal of striae and bubbles. The glass is then annealed at a rate of 2° C/min to 10° C/hr. For removing the distortion of the glass, lower annealing rates are preferred, and therefore, rates outside the aforesaid range can be used.

Specific examples of the composition of a glass batch according to the present invention are given in Table 1. In the table, the amount of $TiO_2$ is expressed in percentages based on the total amount of other materials.

Table 2 shows the amounts of the raw materials given in Table 1 calculated as the component oxides of the glass.

TABLE 1

| Example No. | Raw materials (percent by weight) | | | | | | | | | |
|---|---|---|---|---|---|---|---|---|---|---|
| | $H_3PO_4$ | $BPO_3$ | $AlPO_4$ | $Mg(PO_3)_2$ | $Ca_3(PO_4)_2$ | $Ba(PO_3)_2$ | ZnO | $As_2O_3$ | $Sr(PO_3)_2$ | $TiO_2$ |
| 1 | 6.06 | 4.48 | 8.22 | 8.96 | 0 | 62.45 | 9.83 | 0 | 0 | 0.98 |
| 2 | 6.06 | 4.48 | 8.22 | 8.96 | 0 | 62.45 | 9.83 | 0 | 0 | 1.97 |
| 3 | 16.14 | 4.36 | 7.99 | 8.71 | 0 | 55.16 | 7.64 | 0 | 0 | 0.48 |
| 4 | 16.14 | 4.36 | 7.99 | 8.71 | 0 | 55.16 | 7.64 | 0 | 0 | 0.95 |
| 5 | 16.14 | 4.36 | 7.99 | 8.71 | 0 | 55.16 | 7.64 | 0 | 0 | 1.91 |
| 6 | 16.14 | 4.36 | 7.99 | 8.71 | 0 | 55.16 | 7.64 | 0 | 0 | 2.86 |
| 7 | 22.43 | 4.27 | 7.84 | 14.97 | 6.04 | 37.89 | 5.62 | 0.94 | 0 | 0.05 |
| 8 | 22.43 | 4.27 | 7.84 | 14.97 | 6.04 | 37.89 | 5.62 | 0.94 | 0 | 0.47 |
| 9 | 22.43 | 4.27 | 7.84 | 14.97 | 6.04 | 37.89 | 5.62 | 0.94 | 0 | 0.94 |
| 10 | 22.43 | 4.27 | 7.84 | 14.97 | 6.04 | 37.89 | 5.62 | 0.94 | 0 | 1.87 |
| 11 | 22.43 | 4.27 | 7.84 | 14.97 | 6.04 | 37.89 | 5.62 | 0.94 | 0 | 2.81 |
| 12 | 24.29 | 4.24 | 7.80 | 25.41 | 10.30 | 23.31 | 3.72 | 0.93 | 0 | 0.47 |
| 13 | 24.29 | 4.24 | 7.80 | 25.41 | 10.30 | 23.31 | 3.72 | 0.93 | 0 | 0.93 |
| 14 | 24.29 | 4.24 | 7.80 | 25.41 | 10.30 | 23.31 | 3.72 | 0.93 | 0 | 1.86 |
| 15 | 24.29 | 4.24 | 7.80 | 25.41 | 10.30 | 23.31 | 3.72 | 0.93 | 0 | 2.79 |
| 16 | 24.50 | 7.38 | 13.94 | 22.15 | 0 | 26.20 | 4.86 | 0.97 | 0 | 0.05 |
| 17 | 24.50 | 7.38 | 13.94 | 22.15 | 0 | 26.20 | 4.86 | 0.97 | 0 | 0.49 |
| 18 | 24.50 | 7.38 | 13.94 | 22.15 | 0 | 26.20 | 4.86 | 0.97 | 0 | 0.97 |
| 19 | 24.50 | 7.38 | 13.94 | 22.15 | 0 | 26.20 | 4.86 | 0.97 | 0 | 1.94 |
| 20 | 24.50 | 7.38 | 13.94 | 22.15 | 0 | 26.20 | 4.86 | 0.97 | 0 | 2.91 |
| | | | | | | ($BaCO_3$) | | | | |
| 21 | 1.42 | 10.71 | 21.08 | 58.92 | 0 | 5.42 | 0 | 2.45 | 0 | 0.98 |
| 22 | 1.42 | 10.71 | 21.08 | 58.92 | 0 | 5.42 | 0 | 2.45 | 0 | 1.96 |
| 23 | 1.42 | 10.71 | 21.08 | 58.92 | 0 | 5.42 | 0 | 2.45 | 0 | 2.94 |
| | | | | $MgCO_3$ | | $Ba(PO_3)_2$ | | | $SrCO_3$ | |
| 24 | 0 | 5.69 | 2.24 | 3.91 | 0 | 68.36 | 7.12 | 0 | 12.68 | 0.05 |
| 25 | 0 | 5.69 | 2.24 | 3.91 | 0 | 68.36 | 7.12 | 0 | 12.68 | 0.47 |
| 26 | 0 | 5.69 | 2.24 | 3.91 | 0 | 68.36 | 7.12 | 0 | 12.68 | 0.94 |
| 27 | 0 | 5.69 | 2.24 | 3.91 | 0 | 68.36 | 7.12 | 0 | 12.68 | 1.87 |

TABLE 2

| Example No. | Ingredient oxides (percent by weight) | | | | | | | | | |
|---|---|---|---|---|---|---|---|---|---|---|
| | $P_2O_5$ | $B_2O_3$ | $Al_2O_3$ | BaO | MgO | ZnO | CaO | SrO | $As_2O_3$ | $TiO_2$ |
| 1 | 50.0 | 1.5 | 3.5 | 33.0 | 2.0 | 10.0 | 0 | 0 | 0 | 1.0 |
| 2 | 50.0 | 1.5 | 3.5 | 33.0 | 2.0 | 10.0 | 0 | 0 | 0 | 2.0 |
| 3 | 55.0 | 1.5 | 3.5 | 30.0 | 2.0 | 8.0 | 0 | 0 | 0 | 0.5 |
| 4 | 55.0 | 1.5 | 3.5 | 30.0 | 2.0 | 8.0 | 0 | 0 | 0 | 1.0 |
| 5 | 55.0 | 1.5 | 3.5 | 30.0 | 2.0 | 8.0 | 0 | 0 | 0 | 2.0 |
| 6 | 55.0 | 1.5 | 3.5 | 30.0 | 2.0 | 8.0 | 0 | 0 | 0 | 3.0 |
| 7 | 60.0 | 1.5 | 3.5 | 21.0 | 3.5 | 6.0 | 3.5 | 0 | 1.0 | 0.05 |
| 8 | 60.0 | 1.5 | 3.5 | 21.0 | 3.5 | 6.0 | 3.5 | 0 | 1.0 | 0.5 |
| 9 | 60.0 | 1.5 | 3.5 | 21.0 | 3.5 | 6.0 | 3.5 | 0 | 1.0 | 1.0 |
| 10 | 60.0 | 1.5 | 3.5 | 21.0 | 3.5 | 6.0 | 3.5 | 0 | 1.0 | 2.0 |
| 11 | 60.0 | 1.5 | 3.5 | 21.0 | 3.5 | 6.0 | 3.5 | 0 | 1.0 | 3.0 |
| 12 | 65.0 | 1.5 | 3.5 | 13.0 | 6.0 | 4.0 | 6.0 | 0 | 1.0 | 0.5 |
| 13 | 65.0 | 1.5 | 3.5 | 13.0 | 6.0 | 4.0 | 6.0 | 0 | 1.0 | 1.0 |
| 14 | 65.0 | 1.5 | 3.5 | 13.0 | 6.0 | 4.0 | 6.0 | 0 | 1.0 | 2.0 |
| 15 | 65.0 | 1.5 | 3.5 | 13.0 | 6.0 | 4.0 | 6.0 | 0 | 1.0 | 3.0 |
| 16 | 66.5 | 2.5 | 6.0 | 14.0 | 5.0 | 5.0 | 0 | 0 | 1.0 | 0.05 |
| 17 | 66.5 | 2.5 | 6.0 | 14.0 | 5.0 | 5.0 | 0 | 0 | 1.0 | 0.5 |
| 18 | 66.5 | 2.5 | 6.0 | 14.0 | 5.0 | 5.0 | 0 | 0 | 1.0 | 1.0 |
| 19 | 66.5 | 2.5 | 6.0 | 14.0 | 5.0 | 5.0 | 0 | 0 | 1.0 | 2.0 |
| 20 | 66.5 | 2.5 | 6.0 | 14.0 | 5.0 | 5.0 | 0 | 0 | 1.0 | 3.0 |
| 21 | 67.4 | 3.6 | 9.0 | 4.3 | 13.2 | 0 | 0 | 0 | 2.5 | 1.0 |
| 22 | 67.4 | 3.6 | 9.0 | 4.3 | 13.2 | 0 | 0 | 0 | 2.5 | 2.0 |
| 23 | 67.4 | 3.6 | 9.0 | 4.3 | 13.2 | 0 | 0 | 0 | 2.5 | 3.0 |
| 24 | 40.0 | 2.0 | 1.0 | 37.9 | 2 | 7.6 | 0 | 9.5 | 0 | 0.05 |
| 25 | 40.0 | 2.0 | 1.0 | 37.9 | 2 | 7.6 | 0 | 9.5 | 0 | 0.5 |
| 26 | 40.0 | 2.0 | 1.0 | 37.9 | 2 | 7.6 | 0 | 9.5 | 0 | 1.0 |
| 27 | 40.0 | 2.0 | 1.0 | 37.9 | 2 | 7.6 | 0 | 9.5 | 0 | 2.0 |

In Table 2, the amount of $TiO_2$ is based on the total weight of the other oxides.

In each of the Examples, a glass batch consisting of the ingredients shown in Table 2 was put into a 100 cc platinum crucible to a depth of 50 to 80%, and melted at about 1,300°C for 1 hour. After stirring and refining, the glass was annealed at a rate of 2° C/min. The properties of the resulting glass in each Example are given in Table 3.

In Table 3, the symbol *Lt* stands for liquid phase temperature (devitrification temperature) of the glass, and is a measure of the stability of the glass. The liquid phase temperature is measured as follows: samples of glass particles with a particle diameter of 2 to 3 mm are placed on a platinum plate, and allowed to stand for about 40 minutes in a furnace which has a temperature gradient with respect to place. Then, the samples are taken out, and the devitrification phenomenon is detected microscopically, whereby the devitrification temperature can be determined.

Da represents chemical durability expressed in percent by weight. This is determined as follows: the glass sample is pulverized. Those particles which pass through a 28-mesh sieve but do not pass through a 32-mesh sieve are collected in an amount of specific gravity equivalent. The particles are immersed in 150 ml. of a $HNO_3$ solution having a pH of 2.2 for 1 hout at 100° C. The chemical durability is expressed by the percentage of weight loss during the immersion based on the original weight of the sample particles.

The $\theta_{hg}$ values in Table 3 are plotted in FIG. 1 with numbers of the Examples.

TABLE 3

| Example No. | $n_d$ | $\nu_d$ | θhg | Lt | Da | Coloration |
|---|---|---|---|---|---|---|
| 1 | 1.5961 | 58.5 | 0.467 | | | None. |
| 2 | 1.6020 | 53.9 | 0.476 | 704 | 1.592 | Do. |
| 3 | 1.5756 | 63.0 | 0.456 | | | Do. |
| 4 | 1.5784 | 60.0 | 0.471 | | | Do. |
| 5 | 1.5868 | 55.7 | 0.492 | | | Do. |
| 6 | 1.6005 | 50.2 | 0.493 | 710 | 0.544 | Do. |
| 7 | 1.5545 | 66.0 | 0.448 | 827 | 0.828 | Do. |
| 8 | 1.5587 | 63.8 | 0.458 | | | Do. |
| 9 | 1.5630 | 61.5 | 0.473 | | | Do. |
| 10 | 1.5718 | 56.6 | 0.481 | 815 | 0.728 | Do. |
| 11 | 1.5741 | 52.6 | 0.490 | | | Do. |
| 12 | 1.5505 | 64.4 | 0.455 | | | Do. |
| 13 | 1.5546 | 62.2 | 0.464 | | | Do. |
| 14 | 1.5619 | 57.6 | 0.474 | 880 | 0.891 | Do. |
| 15 | 1.5702 | 50.9 | 0.479 | | | Do. |
| 16 | 1.5377 | 67.9 | 0.436 | 919 | 0.422 | Do. |
| 17 | 1.5423 | 66.0 | 0.453 | | | Do. |
| 18 | 1.5449 | 62.8 | 0.472 | | | Do. |
| 19 | 1.5529 | 57.4 | 0.479 | | | Do. |
| 20 | 1.5590 | 54.4 | 0.483 | 830 | 0.365 | Do. |
| 21 | 1.5136 | 63.5 | 0.477 | | | Do. |
| 22 | 1.5222 | 59.0 | 0.502 | 1,046 | 0.111 | Do. |
| 23 | 1.5291 | 54.7 | 0.503 | | | Do. |
| 24 | 1.6173 | 62.6 | 0.451 | 960 | 2.093 | Do. |
| 25 | 1.6159 | 60.2 | 0.460 | | | Do. |
| 26 | 1.6199 | 58.1 | 0.465 | | | Do. |
| 27 | 1.6277 | 53.1 | 0.490 | | | Do. |

It is seen from the above table that according to the present invention, an anomalous dispersion glass having a large Abbe's number and a large partial dispersion in a short wavelength region is obtained, which at the same time, is colorless and has superior stability, fusibility and chemical durability.

What is claimed is:

1. A colorless anomalous dispersion glass free of alkali metal oxides and having a large Abbe's number consisting of, in percentages by weight, calculated as the component oxides of said glass, from 38 to 70 % $P_2O_5$, from 1.0 to 5.0% $B_2O_3$ and from 1 to 10% $Al_2O_3$ as glass-forming materials, wherein the sum of the amount of said $B_2O_3$ and $Al_2O_3$ is from 2 to 15%, said amount of $Al_2O_3$ and $B_2O_3$ preventing coloration in said glass; from 4 to 38% BAO, from 2 to 17% MgO, from 0 to 10% ZnO, from o to 8% CaO, from 0 to 10% SrO and from 0 to 3% $As_2O_3$ as glass modifiers, wherein the sum of the amount of said BaO, MgO, ZnO, CaO, SrO and $As_2O_3$ is 15 to 60%; and from 0.05 to 4.0%, based on the total weight of said glass-forming materials and said glass modifiers of $TiO_2$, said amount of $TiO_2$ providing an anomalous dispersion without decreasing the Abbe's number of said glass.

2. The glass according to claim 1 which has an Abbe's number of from 45 to 70 and a partial dispersion ratio $\theta_{hg}$ of from 0.430 to 0.505.

3. The glass according to claim 1 consisting of from 50 to 70% $P_2O_5$, from 1 to 5% $B_2O_3$, from 2 to 5% $Al_2O_3$, wherein the sum of the amount of said $B_2O_3$ and $Al_2O_3$ is from 3 to 8% and from 0.5 to 2.5% $TiO_2$, all percentages being by weight.

4. The glass according to claim 3 which as a $\nu_d$ of from 50.2 to 66.0 and a $\theta_{hg}$ of from 0.443 to 0.493.

5. A colorless anomalous dispersion glass free of alkali metal oxides and having a large Abbe's number consisting of, in percentages by weight, calculated as the component oxides of said glass, from 40.0 to 67.4% $P_2O_5$, from 1.5 to 3.6% $B_2O_3$ and from 1 to 9.0% $Al_2O_3$ as glass-forming materials, wherein the sum of the amount of said $B_2O_3$ and $Al_2O_3$ is from 3 to 12.6%, said amount of $Al_2O_3$ and $B_2O_3$ preventing coloration in said glass; from 4.3 to 37.9% BaO, from 2.0 to 13.2% MgO, from 0 to 10.0% ZnO, from 0 to 9.5% SrO, from 0 to 6% CaO and from 0 to 2.5% $As_2O_3$ as glass modifiers, wherein the sum of said BaO, MgO, ZnO, SrO, CaO and $As_2O_3$ is from 20.0 to 57.0%; and from 0.05 to 3.0% based on the total weight of said glass-forming materials and glass modifiers, of $TiO_2$, said amount of $TiO_2$ providing an anomalous dispersion without decreasing the Abbe's number of said glass, and said amounts of MgO, $As_2O_3$ and ZnO also serving to prevent coloration in said glass.

6. The glass according to claim 5 which has a $\nu_d$ of from 50.2 to 67.9 and a $\theta_{hg}$ of from 0.436 to 0.503.

7. In an anomalous dispersion glass consisting essentially of $P_2O_5$ as a basic glass-forming material and $TiO_2$ as an additive to obtain an anomalous dispersion, wherein large quantities of alkali metal oxides are added thereto to prevent coloration in said glass, resulting in a glass of poor stability and chemical durability, the improvement consisting of a colorless anomalous dispersion glass free of alkali metal oxides and having an Abbe's number of from 45 to 70, a partial dispersion ratio $\theta_{hg}$ of from 0.430 to 0.505, and good stability and chemical durability, said glass consisting of, in percentages by weight, calculated as the component oxides of said glass, from 38 to 70% $P_2O_5$, from 1.0 to 5.0 $B_2O_3$ and from 1 to 10% $Al_2O_3$ as glass -forming materials, wherein the sum of the amount of said $B_2O_3$ and $Al_2O_3$ is from 2 to 15%, said amount of $Al_2O_3$ and $B_2O_3$ preventing coloration in said glass; from 4 to 38% BaO, from 2 to 17% MgO, from 0 to 10% ZnO, from 0 to 8% CaO, from 0 to 10% SrO and from 0 to 3% $As_2O_3$ as glass modifiers, wherein the sum of the amount of said BaO, MgO, ZnO, CaO, SrO and $As_2O_3$ is 15 to 60%, said amount of MgO, $As_2O_3$ and ZnO also serving to prevent coloration in said glass; and from 0.05 to 4.0%, based on the total weight of said glass-forming materials and said glass modifiers, of $TiO_2$, said amount of $TiO_2$ providing an anomalous dispersion without decreasing the Abbe's number of said glass.

* * * * *